United States Patent
Hays et al.

(10) Patent No.: US 7,809,741 B2
(45) Date of Patent: Oct. 5, 2010

(54) GENERATING AND UTILIZING COMPOSITE KEYS IN LIEU OF COMPOUND KEYS

(75) Inventors: Christopher A Hays, Monroe, WA (US); Alexandre I Mineev, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 183 days.

(21) Appl. No.: 11/395,105

(22) Filed: Mar. 31, 2006

(65) Prior Publication Data

US 2007/0233718 A1  Oct. 4, 2007

(51) Int. Cl.
*G06F 17/30* (2006.01)

(52) U.S. Cl. .................................... 707/758
(58) Field of Classification Search ............. 707/101, 707/758, 807
See application file for complete search history.

(56) References Cited

U.S. PATENT DOCUMENTS

| | | | |
|---|---|---|---|
| 5,010,478 A * | 4/1991 | Deran | 707/100 |
| 5,283,894 A * | 2/1994 | Deran | 707/1 |
| 5,530,854 A | 6/1996 | Emery et al. | |
| 5,555,409 A * | 9/1996 | Leenstra et al. | 707/101 |
| 5,799,184 A * | 8/1998 | Fulton et al. | 707/2 |
| 5,870,747 A | 2/1999 | Sundaresan | |
| 5,966,703 A | 10/1999 | Burrows | |
| 6,003,036 A | 12/1999 | Martin | |
| 6,169,990 B1 | 1/2001 | McGregor et al. | |
| 6,223,182 B1 | 4/2001 | Agarwal et al. | |
| 6,446,062 B1 | 9/2002 | Levine et al. | |
| 6,466,942 B1 * | 10/2002 | Tolkin | 707/102 |
| 6,546,394 B1 | 4/2003 | Chong et al. | |
| 6,618,833 B1 | 9/2003 | Hill et al. | |
| 6,775,655 B1 * | 8/2004 | Peinado et al. | 705/59 |
| 6,795,821 B2 | 9/2004 | Yu | |
| 6,859,808 B1 | 2/2005 | Chong et al. | |
| 2004/0015506 A1 * | 1/2004 | Anonsen et al. | 707/100 |
| 2004/0210946 A1 | 10/2004 | Shin | |
| 2004/0260706 A1 * | 12/2004 | Anonsen et al. | 707/100 |

OTHER PUBLICATIONS

Chong et al. "B+-Tree Indexes with Hybrid Row Identifiers in Oracle8i", pp. 341-348, 17th International Conference on Data Engineering (ICDE'01), Apr. 2001.

Chong et al., "A Mapping Mechanism to Support Bitmap Index and Other Auxiliary Structures on Tables Stored as Primary B+-trees", pp. 625-628, Proceedings of the 2002 ACM CIKM International Conference on Information and Knowledge Management (CIKM'02), Nov. 2002.

* cited by examiner

*Primary Examiner*—James Trujillo
*Assistant Examiner*—Dawaune Conyers (57) ABSTRACT

Various technologies and techniques are disclosed that improve the retrieval or interaction with data in databases. A database has one or more tables with compound keys. An entity key that is a single composite key of each of the compound keys is generated via an invertible composition transformation. The composite entity key is a binary serialization of the respective compound keys. The composite entity key is used by separate applications to interact with the database instead of the respective underlying compound keys. The composite entity key is decomposed into the underlying compound keys when a particular database operation needs to be performed. The results are then returned to the separate application with the composite entity key.

20 Claims, 6 Drawing Sheets

GENERATING AND UTILIZING COMPOSITE KEYS IN LIEU OF COMPOUND KEYS

BACKGROUND

It is common for databases to contain tables for which the identifying columns consist of a collection of items rather than a single item. For example, whereas a customer table might have a simple key such as customer_id, a product table may have a compound key such as product_category_id+product_subcategory_id+product_id. While the user of a reporting or analysis tool may think of the entity as a single thing (e.g. a product), the compound nature of the identifier (e.g. the compound key) forces the user or client application to track a set of attributes to identify a single instance of the entity (e.g. "the product with product category 1, product subcategory 14 and product id 6"). This requires the user or client application to become familiar with database-specific concepts and/or structures instead of focusing on simply obtaining the answers to the questions using the reporting or other analysis tool. This task can be quite challenging for most knowledge workers and distracts them from focusing on the objective at hand.

SUMMARY

Various technologies and techniques are disclosed that improve the retrieval or interaction with data in databases. A database has one or more tables with compound keys. An entity key that is a single, reversible composite key of each of the compound keys is generated. The entity key is used by separate applications to interact with the database instead of the respective underlying compound key. The entity key is reversed into the underlying compound key when a particular database operation needs to be performed. The results are then returned to the separate application with the entity key, where applicable.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a database application that generates a composite entity key for use in lieu of compound keys, but the system also serves other purposes in addition to these. In one implementation, one or more of the techniques described herein can be implemented as features within a database program such as MICROSOFT® SQL Server, or from any other type of program or service that manages or interacts with data in one or more underlying data stores.

Figure 1:
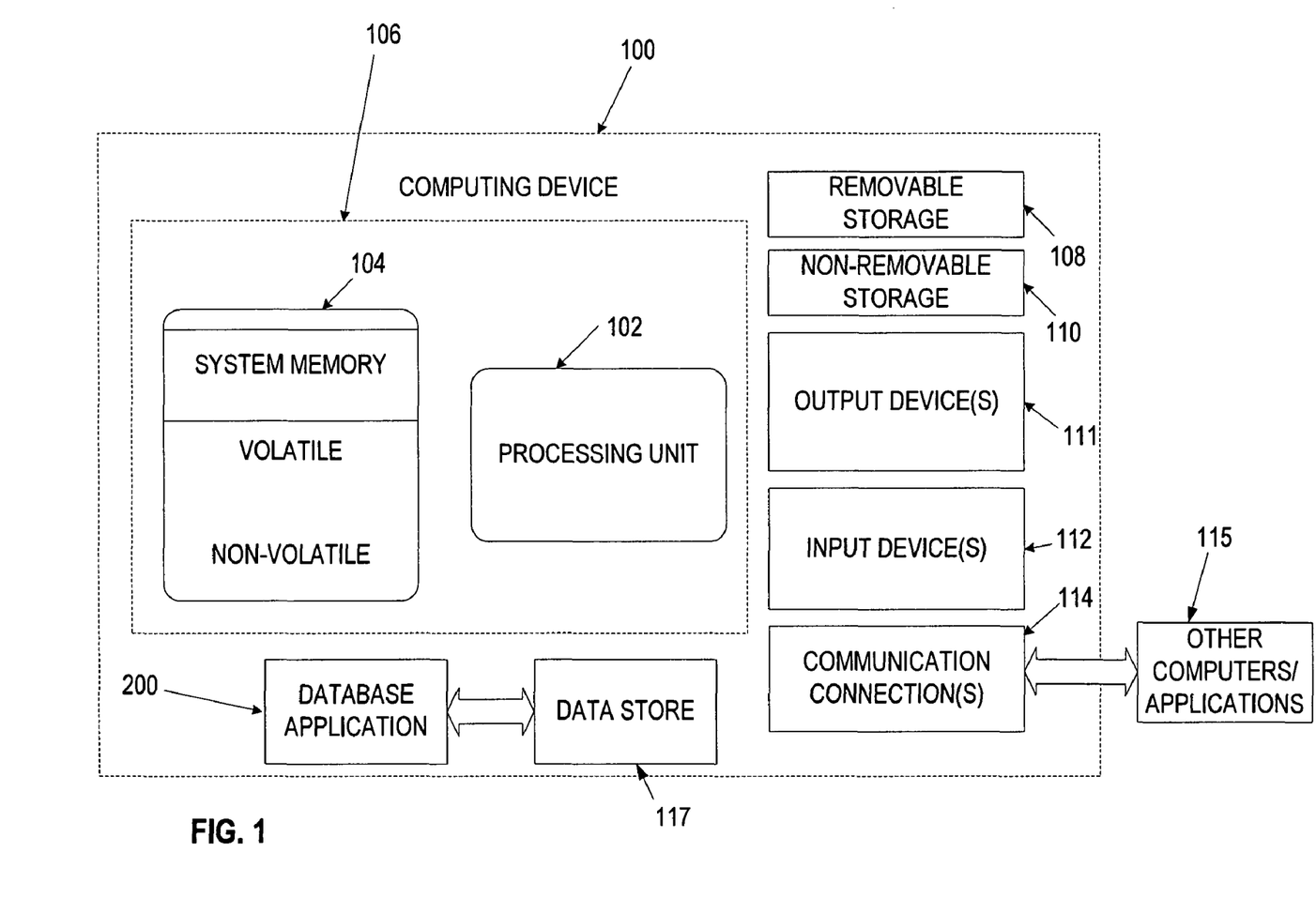
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers and/or applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes database application 200 and data store 117. Database application 200 is operable to communicate with data store 117 to retrieve and/or update data. Database application 200 will be described in further detail in FIG. 2.

Figure 2:
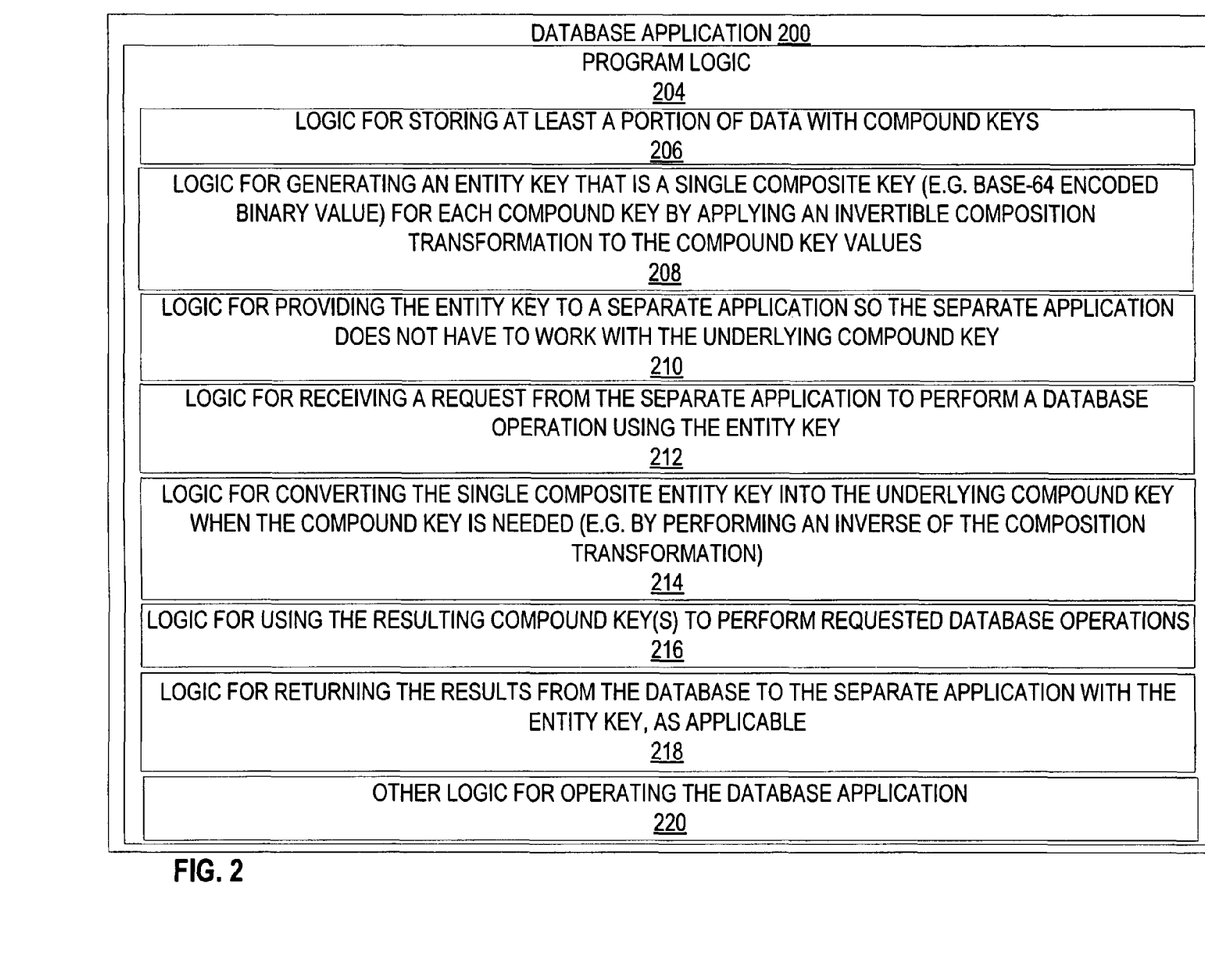
FIG. 2 is a diagrammatic view of a database application of one implementation operating on the computer system of FIG. 1.

Turning now to FIG. 2 with continued reference to FIG. 1, a database application 200 operating on computing device 100 is illustrated. Database application 200 is one of the application programs that reside on computing device 100. However, it will be understood that database application 200 and/or data store 117 can alternatively or additionally be embodied as computer-executable instructions on one or more computers and/or in different variations than shown on FIG. 1. Alternatively or additionally, one or more parts of database application 200 and/or data store 117 can be part of system memory 104, on other computers and/or applications 115, or other such variations as would occur to one in the computer software art.

Database application 200 includes program logic 204, which is responsible for carrying out some or all of the techniques described herein. Program logic 204 includes logic for storing at least a portion of data with compound keys 206; logic for generating an entity key that is a single composite key (e.g. base-64 encoded binary value) for each compound key by applying an invertible composition transformation to the compound key values 208; logic for providing the entity key to a separate application so the separate application does not have to work with the underlying compound key 210; logic for receiving a request from the separate application to perform a database operation using the entity key 212; logic for converting the single composite entity key into the underlying compound key when the compound key is needed (e.g. by performing an inverse of the composition transformation) 214; logic for using the resulting compound key(s) to perform requested database operations 216; logic for returning the results from the database to the separate application with the entity key, as applicable 218; and other logic for operating the database application 220. In one implementation, program logic 204 is operable to be called programmatically from another program, such as using a single call to a procedure in program logic 204.

The examples presented herein illustrate using these technologies and techniques with a database application in one implementation. However, as discussed previously, in other implementations these technologies and techniques are used with other systems for storing and/or retrieving data from one or more data stores.

Figure 3:
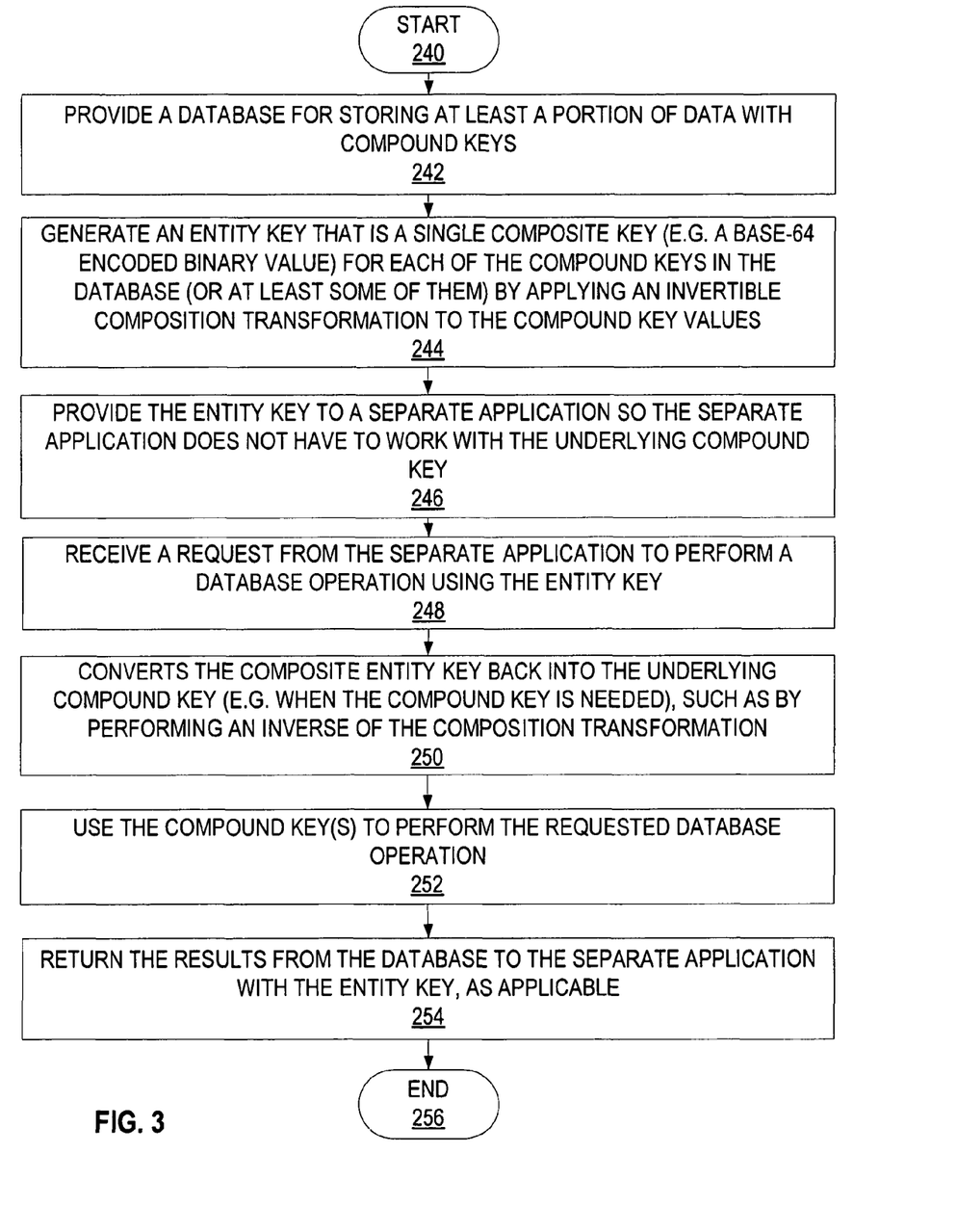
FIG. 3 is a high-level process flow diagram for one implementation of the system of FIG. 1.
Figure 4:
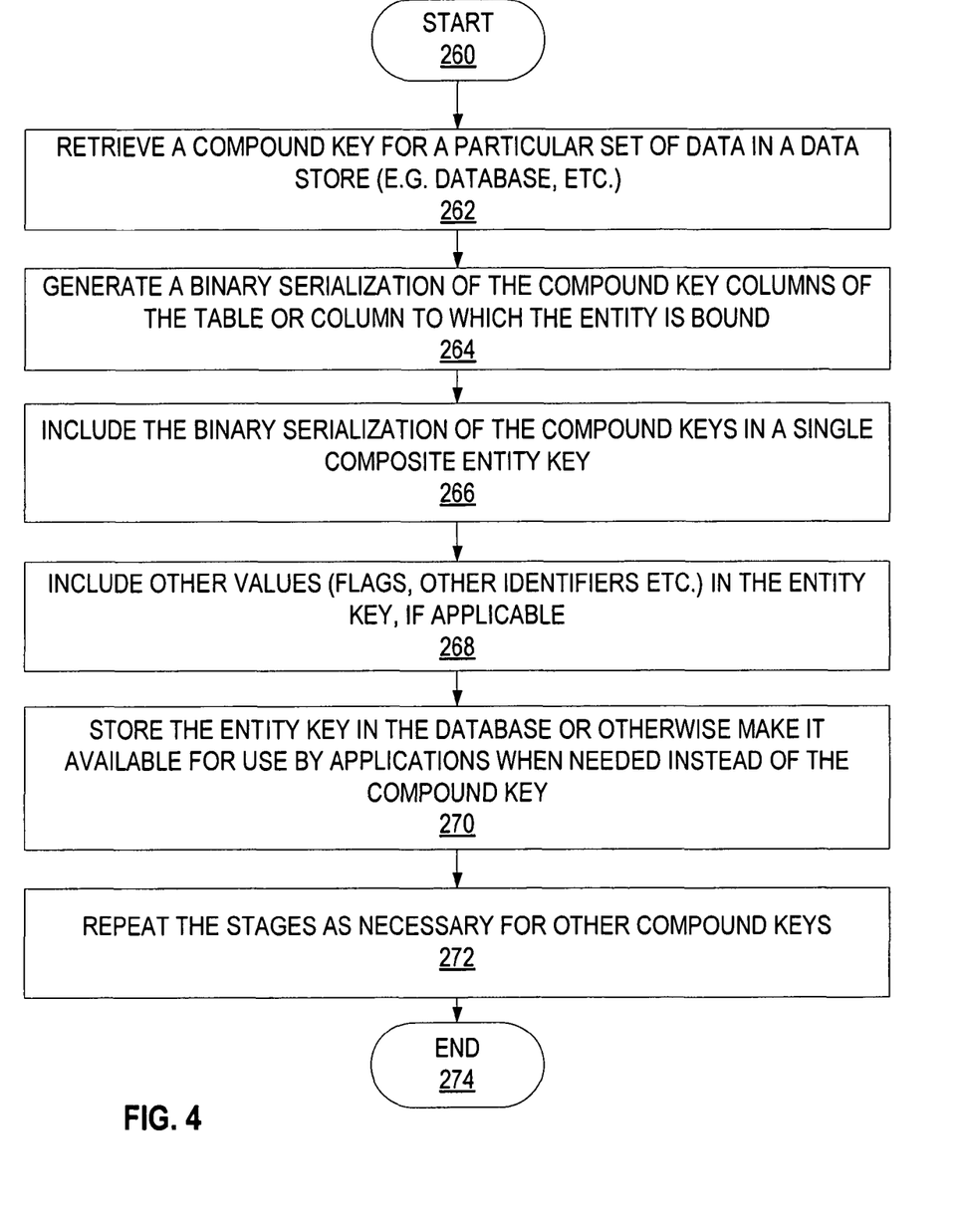
FIG. 4 is a process flow diagram for one implementation of the system of FIG. 1 illustrating the stages involved in generating an entity key from the compound key.

Turning now to FIGS. 3-4 with continued reference to FIGS. 1-2, the stages for implementing one or more implementations of database application 200 are described in further detail. FIG. 3 is a high level process flow diagram for database application 200. In one form, the process of FIG. 3 is at least partially implemented in the operating logic of computing device 100.

The procedure begins at start point 240 with providing a database (e.g. data store 117) for storing at least a portion of data with compound keys (stage 242). An entity key that is a single composite key (e.g. a base-64 encoded binary value) is generated for each of the compound keys in the database (or at least some of them) by applying an invertible composition transformation to the compound key values (stage 244). The entity key is provided to a separate application so the separate application does not have to work with the underlying compound key (stage 246). Database application 200 receives a request from the separate application to perform a database operation using the entity key (stage 248). Database application 200 converts the composite entity key back into the underlying compound key (e.g. when the compound key is needed), such as by performing an inverse of the composition transformation (stage 250). Database application 200 then uses the compound key(s) to perform the requested database operation (stage 252). The results are returned from database application 200 to the separate requesting application with the entity key, as applicable (254). The process ends at end point 256.

FIG. 4 illustrates one implementation of a more detailed process for generating an entity key from a compound key. In one form, the process of FIG. 4 is at least partially implemented in the operating logic of computing device 100. The procedure begins at start point 260 with retrieving a compound key for a particular set of data in data store 117 of database application 200 (stage 262). Database application 200 generates a binary serialization of the compound key columns of the table or column to which the entity is bound (stage 264). The binary serialization of the compound keys is included in a single composite entity key (stage 266). Other values (flags, other identifiers etc.) are included in the entity key, if applicable (stage 268). In one implementation, the entity key is stored in database application 200 for use by applications instead of the compound key (stage 270). In another implementation, the entity key is not stored in database application 200, but is instead generated and used as needed by separate applications and/or database application 200. Other variations are also possible. The stages as repeated as necessary for other compound keys (stage 272). The process ends at end point 274.

Figure 5:
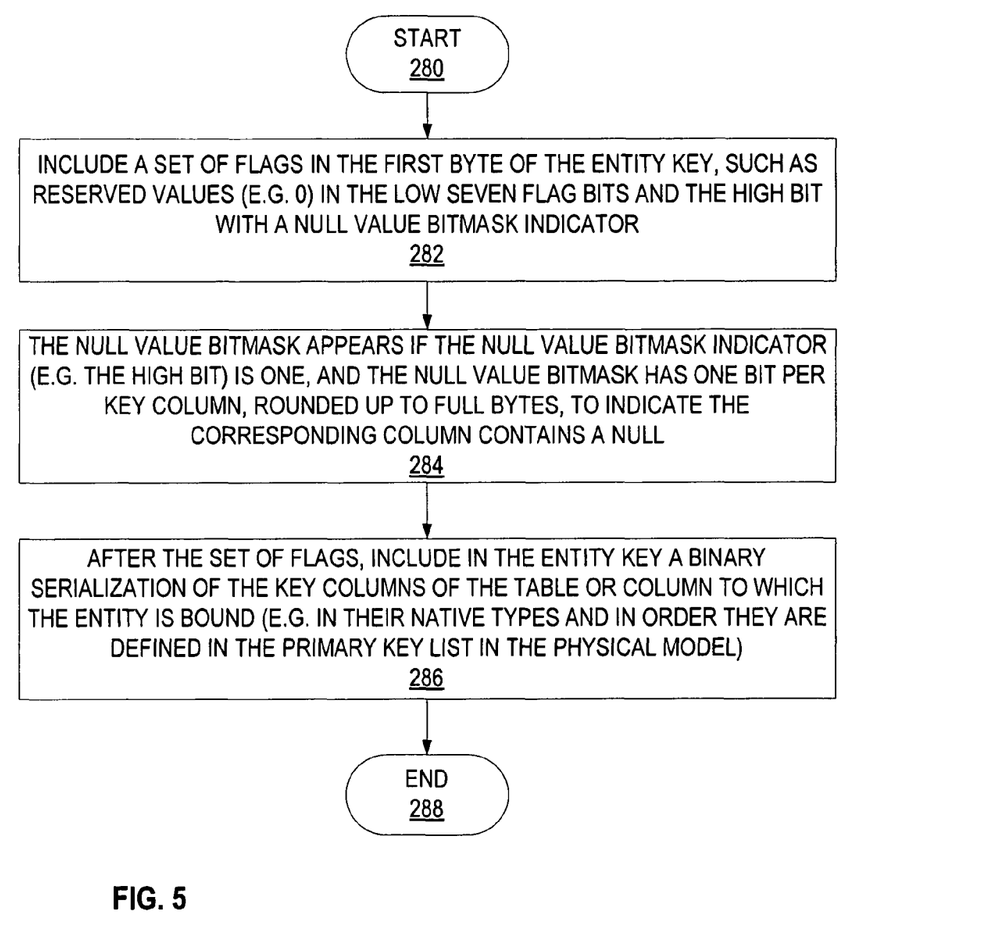
FIG. 5 is a process flow diagram for one implementation of the system of FIG. 1 illustrating more detailed stages involved in generating an entity key from the compound key.

FIG. 5 illustrates the more detailed stages involved in generating a composite entity key from the compound key in one implementation. In one form, the process of FIG. 5 is at least partially implemented in the operating logic of computing device 100. The procedure begins at start point 280 with including a set of flags in the first byte of the entity key, such as reserved values in the low seven flags bits and the high bit with a null value bitmask indicator (stage 282). In one implementation, the reserved values in the low seven flag bits are zero. In other implementations, values other instead of or in addition to zero can be used. In one implementation, the null value bitmask appears if and only if the null value bitmask indicator (e.g. the high bit in stage 282) is a value of one (stage 284). The null value bitmask has one bit per key column, rounded up to full bytes, to indicate that the corresponding column contains a null (stage 284). After the set of flags, database application 200 includes in the entity key a binary serialization of the key columns of the table or column to which the entity is bound (e.g. in their native types and in order they are defined in the primary key list in the physical model) (stage 286). Numerous other variations for generating a composite entity key from compound keys can also be used instead of or in addition to the implementation described in FIG. 5. The process ends at end point 288.

Figure 6:
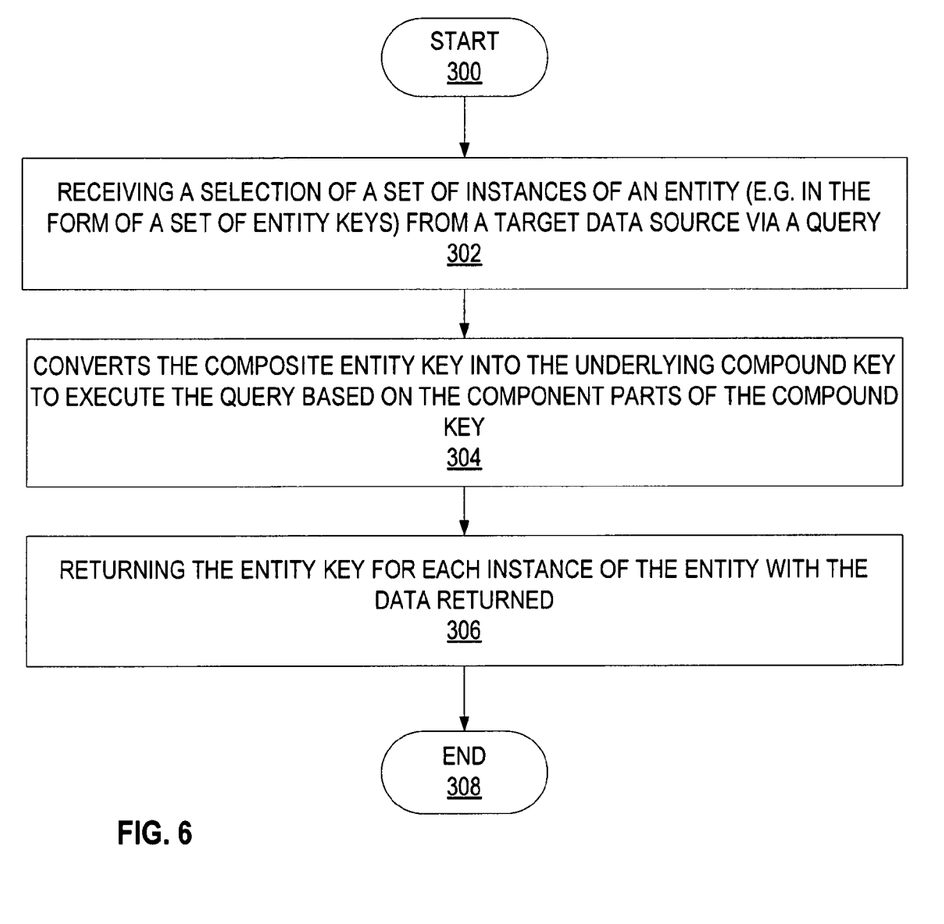
FIG. 6 is a process flow diagram for one implementation of the system of FIG. 1 illustrating the stages involved in using the entity key upon receiving selection of entity instances from a query.

FIG. 6 illustrates the process for using the entity key upon receiving selection of entity instances from a query in one implementation in more detail. In one form, the process of FIG. 6 is at least partially implemented in the operating logic of computing device 100. The procedure begins at start point 300 with receiving a selection of a set of instances of an entity (in the form of a set of entity keys) from a target data source via a query (stage 302). Database application 200 converts the composite entity key into the underlying compound key and executes the query (stage 304) based on the component parts of the compound key. The entity key is returned for each instance of the entity along with the requested data (stage 306). The process ends at end point 308.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-implemented method for generating a composite key for interacting with a data store, the method comprising the steps of:
   storing data for an entity having a plurality of attributes with a compound key, wherein values of the plurality of attributes of the entity are stored in a data store with each value of each attribute of the entity stored in a separate column of the data store, and the compound key is associated with a plurality of key columns of the data store to which the entity is bound that contain compound key values of the entity corresponding to a set of attributes identified by the compound key;
   retrieving a plurality of compound key values of the entity at a database application on a computing device, the plurality of compound key values of the entity retrieved from the plurality of key columns of the data store to which the entity is bound that correspond to the set of attributes identified by the compound key;
   generating a single composite key for the entity based on component parts of the compound key by applying an invertible composition transformation to the plurality of compound key values of the entity retrieved from the plurality of key columns of the data store to which the entity is bound, the single composite key for the entity including a single encoded value that is generated from binary serialization of the plurality of key columns of the data store to which the entity is bound and that is converted back into the plurality of compound key values of the entity when an inverse of the invertible composition transformation that was used to generate the single composite key for the entity is applied to decode the single encoded value; and
   providing the single composite key for the entity to a separate application for requesting access to the data for the entity stored in the data store using the single composite key of for the entity.

2. The computer-implemented method of claim 1, further comprising:
   receiving a request from the separate application to access a portion of data in the data store using the single composite key for the entity; and
   generating a compound key for the entity comprising the plurality of compound key values of the entity by applying the inverse of the invertible composition transformation to the single composite key for the entity.

3. The computer-implemented method of claim 2, further comprising:
   using the compound key for the entity to access the data stored for the entity in the data store; and
   returning a set of results to the separate application along with the single composite key for the entity and not the compound key for the entity.

4. The computer-implemented method of claim 1, further comprising:
   generating, a corresponding composite key for each of a plurality of compound keys in the data store.

5. The computer-implemented of claim 1, wherein the single composite key for the entity further includes a null value bitmask having bits corresponding to the plurality of key columns if one or more of the plurality of key columns of the data store to which the entity is bound contain a null value.

6. The computer-implemented method of claim 5, wherein the composite key includes a set of flags in a first byte of the composite key.

7. The computer-implemented method of claim 6, wherein the composite key includes a null value bitmask indicator in a high bit of the first byte.

8. The computer-implemented method of claim 1, wherein the single composite key for the entity has a base-64 encoding.

9. A computer-readable storage medium having computer-executable instructions causing a computer to perform the steps recited in claim 1.

10. A computer-readable storage medium storing computer-executable instructions for causing a computer to perform steps comprising:
   storing data for an entity having a plurality of attributes with a compound key, wherein values of the plurality of attributes of the entity are stored in a data store with each value of each attribute of the entity stored in a separate column of the data store, and the compound key is associated with a plurality of key columns of the of the data store to which the entity is bound that contain compound key values corresponding to a set of attributes identified by the compound key;
   retrieving a plurality of compound key values of the entity, the plurality of compound key values of the entity retrieved from the plurality of key columns of the data store to which the entity is bound that correspond to the set of attributes identified by the compound key;
   generating a single composite key for the entity based on component parts of the compound key by applying an invertible composition transformation to the plurality of compound key values of the entity retrieved from the plurality of key columns of the data store to which the entity is bound, the single composite key for the entity including a single encoded value that is generated from binary serialization of the plurality of key columns of the data store to which the entity is bound and that is converted back into the plurality of compound key values of the entity when an inverse of the invertible composition transformation that was used to generate the single composite key for the entity is applied to decode the single encoded value;
   providing the single composite key for the entity to a separate application;
   receiving a request from the separate application to perform a database operation on data stored for the entity in the data store using the single composite key for the entity to request access to the data stored for the entity in the data store;
   generating a compound key for the entity comprising the plurality of compound key values of the entity by applying the inverse of the invertible composition transformation to the single composite key for the entity; and
   using the compound key for the entity to perform the database operation on the data stored for the entity in the data store.

11. The computer-readable storage medium of claim 10, further storing computer-executable instructions for:
   returning a result of the database operation to the separate application with the single composite key for the entity.

12. The computer-readable storage medium of claim 10, wherein the single composite key for the entity further includes a null value bitmask having bits corresponding to the plurality of key columns if one or more of the plurality of key columns of the data store to which the entity is bound contain a null value.

13. The computer-readable storage medium of claim 10, wherein the single composite key for the entity has a base-64 encoding.

14. The computer-readable storage medium of claim 10, wherein the single composite key for the entity is provided so the separate application does not have to work with the compound key for the entity.

15. A computer-implemented method for using a composite key of to interact with a data store, the method comprising the steps of:
   storing data for an entity having a plurality of attributes with a compound key, wherein values of the plurality of attributes of the entity are stored in a data store with each value of each attribute of the entity stored in a separate column of the data store, and the compound key is associated with a plurality of key columns of the data store to which the entity is bound that contain compound key values corresponding to a set of attributes identified by the compound key;
   generating a binary serialization of the plurality of key columns of the data store to which the entity is bound at a database application on a computing device, the binary serialization of the plurality of key columns of the data store comprising a single encoded binary value that is converted into a plurality of compound key values of the entity when the single encoded binary value is decoded;
   including the binary serialization of the compound key in a single composite key for the entity;
   including a null value bitmask having bits corresponding to the plurality of key columns in the single composite key for the entity if one or more of the plurality of key columns of the data store to which the entity is bound contain a null value;
   receiving a request to access the data stored for the entity in the data store using the single composite key for the entity;
   converting the binary serialization of the plurality of key columns of the data store included in the single composite key for the entity from the singled encoded binary value into the plurality of compound key values of the entity;
   generating a compound key for the entity comprising the plurality of compound key values of the entity; and
   using the compound key for the entity to perform a database operation on the data stored for the entity in the data store.

16. The computer-implemented method of claim 15, further comprising:
   receiving a selection of at least one instance of the entity from a target data source through a query.

17. The computer-implemented method of claim 15, wherein the single composite key for the entity has a base-64 encoding.

18. The computer-implemented method of claim 15, wherein the single composite key for the entity is provided so a separate application does not have to work with a compound key for the entity.

19. The computer-implemented method of claim 15, further comprising:
   storing the single composite key for the entity in the data store.

20. A computer-readable storage medium having computer-executable instructions causing a computer to perform the steps recited in claim 15.

\* \* \* \* \*